United States Patent
Zhou

(10) Patent No.: US 9,632,221 B2
(45) Date of Patent: Apr. 25, 2017

(54) OPTICAL RESIN COMPOSITION AND USE THEREOF

(71) Applicant: BOE TECHNOLOGY GROUP CO., LTD., Beijing (CN)

(72) Inventor: Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 783 days.

(21) Appl. No.: 13/863,695

(22) Filed: Apr. 16, 2013

(65) Prior Publication Data

US 2013/0271837 A1    Oct. 17, 2013

(30) Foreign Application Priority Data

Apr. 17, 2012  (CN) .......................... 2012 1 0113603
Dec. 21, 2012  (WO) ................ PCT/CN2012/087194

(51) Int. Cl.
| C09K 19/32 | (2006.01) |
| G02B 5/18 | (2006.01) |
| G02B 1/04 | (2006.01) |

(52) U.S. Cl.
CPC ............. *G02B 5/1833* (2013.01); *G02B 1/04* (2013.01)

(58) Field of Classification Search
USPC ........................................... 525/300; 430/18
See application file for complete search history.

(56) References Cited

U.S. PATENT DOCUMENTS

| 2007/0096056 A1* | 5/2007 | Takeuchi ............... C08F 283/10 |
| | | 252/299.01 |
| 2008/0281015 A1* | 11/2008 | Futami ................... C08F 283/00 |
| | | 522/178 |
| 2010/0331515 A1* | 12/2010 | Takeuchi ............... C08G 75/08 |
| | | 528/374 |
| 2014/0147776 A1* | 5/2014 | Ito ........................... G03F 7/038 |
| | | 430/18 |

FOREIGN PATENT DOCUMENTS

| CN | 1890281 A | 1/2007 |
| CN | 101349770 A | 1/2009 |
| CN | 101429258 A | 5/2009 |
| CN | 101717204 A | 6/2010 |
| CN | 107117204 A * | 6/2010 |

(Continued)

OTHER PUBLICATIONS

International Search Report dated Dec. 21, 2013, PCT/CN2012/087194.

(Continued)

*Primary Examiner* — Mark Kaucher
*Assistant Examiner* — Henry Hu
(74) *Attorney, Agent, or Firm* — Ladas & Parry LLP

(57) ABSTRACT

The present disclosure provides an optical resin composition and use thereof. The optical resin composition of the present disclosure comprises unsaturated phenol formaldehyde epoxy acrylate oligomer: 40%-50%, episulfide oligomer: 20%-30%, methacrylate resin: 20%-50%, and multifunctional active acrylate monomer: 2%-5%, which achieves an optimal match with the refractive index of the liquid crystal lens layer, so as to improve the visual effect of the naked-eye 3D/2D switchable birefringent grating under 2D conditions.

3 Claims, 2 Drawing Sheets

(56) References Cited

FOREIGN PATENT DOCUMENTS

| | | | |
|---|---|---|---|
| CN | 102167962 A | * | 8/2011 |
| CN | 102181192 A | | 9/2011 |
| CN | 102659985 A | | 9/2012 |

OTHER PUBLICATIONS

International Preliminary Report on Patentability dated Oct. 21, 2014; PCT/CN2012/087194.
International Search Report, dated Dec. 21, 2013; PCT/CN2012/087194.
Second Chinese Office Action dated Mar. 24, 2014; Appln. No. 201210113603.3.
First Chinese Office Action dated Jul. 3, 2013; Appln. No. 201210113603.3

* cited by examiner

OPTICAL RESIN COMPOSITION AND USE THEREOF

TECHNICAL FIELD

The embodiments of the present disclosure relates to an optical resin composition for preparation of the optical transparent layer having concave lens structure in a birefringent grating and use thereof.

BACKGROUND OF THE INVENTION

LC Lens Naked-Eye Stereoscopic Display is a mainstream technique in the current stereoscopic display field. Birefringent grating is a major component of the elements for achieving this technique. Its basic structure is shown in FIG. 1 and comprises the following parts: an optical resin substrate 1, an optical transparent layer 2 having concave lens structure, and a liquid crystal lens layer 3. Working under ideal 2D state, as shown in FIG. 2, when the polarized light emitted from under is perpendicular to the orientation of liquid crystals in the liquid crystal lens layer, the effective refractive index will present the extraordinary refractive index of the liquid crystal. Since the refractive index of the material in the optical transparent layer having concave lens structure, i.e., $n_x'$ is identical to the ordinary refractive index of the liquid crystal lens layer, the refraction of light at the surface of the liquid crystal lens will then be offset, and the final image observed by the user will be the two dimensional image with the original resolution. However, in real 2D working conditions, as shown in FIG. 3, due to influence of many process conditions, the liquid crystal in the liquid crystal lens layer will not always be oriented optimally. In this case, the effective refractive index of the liquid crystal lens layer, i.e., $n_e'$, is not always identical to the ordinary refractive index of the liquid crystal, and a certain deviation will occur, which will cause the mismatch between the refractive indices of the optical transparent layer and the liquid crystal lens layer, resulting in refraction at the curved surface of the lens, that is, there exists residual lens effect. In this case, the displayed 2D image will be observed with some dark bands or shadowed lines, which will severely affect the visual effect under 2D conditions.

SUMMARY OF INVENTION

In order to solve the aforementioned problems, the present disclosure provides an optical resin composition. The film made from curing this optical resin composition has a refractive index of 1.5015 to 1.53, which matches perfectly with the refractive index of the liquid crystal lens layer, so as to improve the visual effect of the naked-eye 3D/2D switchable birefringent grating under 2D conditions.

One aspect of the present disclosure provides an optical resin composition, comprising the following substances in the following mass percentage:
  unsaturated phenol formaldehyde epoxy acrylate oligomer: 40%-50%,
  episulfide oligomer: 20%-30%,
  methacrylate resin: 20%-50%, and
  multifunctional active acrylate monomer: 2%-5%.

The total amount of substances comprised in the aforementioned optical resin composition is, e.g., 100%.

In the optical resin composition according to the present disclosure, said episulfide oligomer is 2,5-diacrylic-chloropropanoic acid ester-1,3,4-thiadiazole, 2,5-diacrylic-chlorobutanoic acid ester-1,3,4-thiadiazole, 2,5-dimethyl-acrylicpropylene glycol ester-1,3,4-thiadiazole or 2,5-dimethylacrylic-propylene glycerol ester-1,3,4-thiadiazole. The structures of these episulfide oligomers are shown by the following chemical formulas.

[Chemical Formula 1]

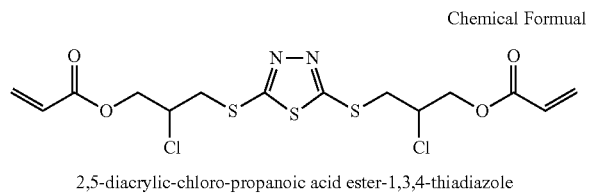

Chemical Formual 1

2,5-diacrylic-chloro-propanoic acid ester-1,3,4-thiadiazole

[Chemical Formula 2]

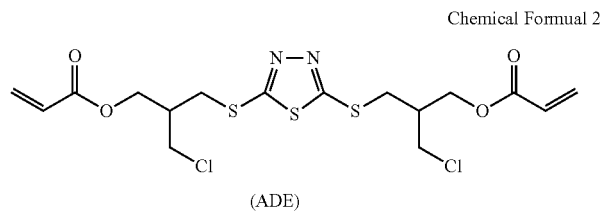

Chemical Formual 2

(ADE)

2,5-diacrylic-chloro-butanoic acid ester-1,3,4-thiadiazole

[Chemical Formula 3]

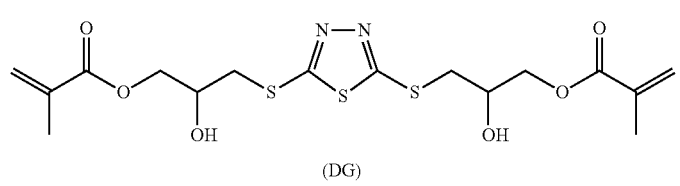

Chemical Fomrula 3

(DG)

2,5-dimethyl-acrylic-propylene glycol ester-1,3,4-thiadiazole

[Chemical Formula 4]

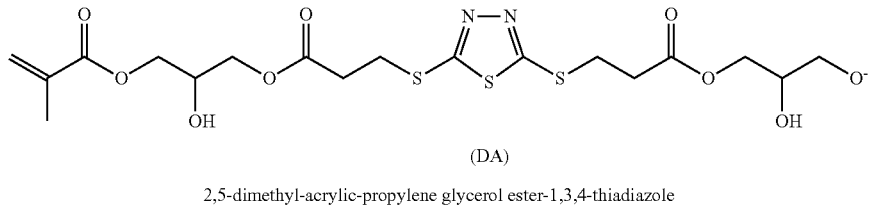

Chemical Formula 4

(DA)
2,5-dimethyl-acrylic-propylene glycerol ester-1,3,4-thiadiazole

In the optical resin composition according to the present disclosure, said unsaturated phenol formaldehyde epoxy acrylate oligomer is o-cresol formaldehyde epoxy acrylate, phenol formaldehyde epoxy methacrylate or o-cresol phenol formaldehyde epoxy acrylate.

The methacrylate resin according to the present disclosure is the commonly used methacrylate resins, and it is an optical transparent resin that can be cured by UV, having a viscosity of 2000 to 5000 cp and a light transmittance of 95% or more.

In the optical resin composition according to the present disclosure, said multifunctional active acrylate monomer is selected from any one or more of tetrapropylene glycol diacrylate, trimethylolpropane triacrylate and tripropylene glycol diacrylate.

Another object of the present disclosure is to provide a birefringent grating, wherein the optical transparent layer having concave lens structure is made from the aforementioned optical resin composition.

The film made from curing the optical resin composition of the present disclosure has a refractive index of 1.5015 to 1.53, which achieves an optimal match with the refractive index of the liquid crystal lens layer, so as to improve the visual effect of the naked-eye 3D/2D switchable birefringent grating under 2D conditions.

1. An optical resin composition comprising the following substances in the following mass percentage:
   unsaturated phenol formaldehyde epoxy acrylate oligomer: 40%-50%,
   episulfide oligomer: 20%-30%,
   methacrylate resin: 20%-50%, and
   multifunctional active acrylate monomer: 2%-5%.

2. The optical resin composition according to item 1, wherein the film made from curing the said optical resin composition has a refractive index of 1.5015 to 1.53.

3. The optical resin composition according to items 1 or 2, wherein said episulfide oligomer is at least one of 2,5-diacrylic-chloro-propanoic acid ester-1,3,4-thiadiazole, 2,5-diacrylic-chloro-butanoic acid ester-1,3,4-thiadiazole, 2,5-dimethyl-acrylic-propylene glycol ester-1,3,4-thiadiazole or 2,5-dimethyl-acrylic-propylene glycerol ester-1,3,4-thiadiazole.

4. The optical resin composition according to any one of items 1~3, wherein said unsaturated phenol formaldehyde epoxy acrylate oligomer is at least one of o-cresol formaldehyde epoxy acrylate, phenol formaldehyde epoxy methacrylate or o-cresol phenol formaldehyde epoxy acrylate.

5. The optical resin composition according to any one of items 1~4, wherein said multifunctional active acrylate monomer is at least one of tetrapropylene glycol diacrylate, trimethylolpropane triacrylate or tripropylene glycol diacrylate.

6. Use of the optical resin composition according to any one of items 1~5 for preparing a birefringent grating.

7. A birefringent grating, wherein the optical transparent layer having concave lens structure is made from the optical resin composition according to any one of items 1~5.

BRIEF DESCRIPTION OF DRAWINGS

In order to more clearly illustrate the technical solutions of the embodiments of the present invention, figures of the embodiments will be briefly introduced below. Apparently, the figures in the following description merely relate to some embodiments of the present invention and are not limiting the present invention.

DETAILED DESCRIPTIONS OF INVENTION

Figure 1:
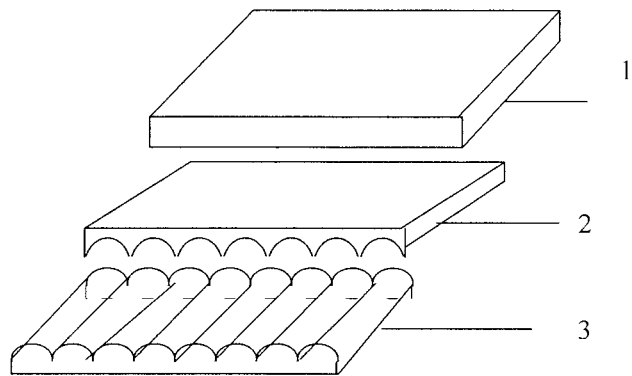
FIG. 1 shows the primary structure of the birefringent grating.
Figure 2:
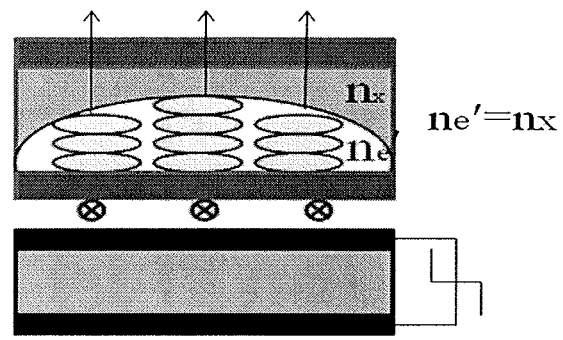
FIG. 2 shows a working diagrammatic sketch of a birefringent grating using a conventional optical resin composition as shown in FIG. 1 under ideal 2D conditions.
Figure 3:
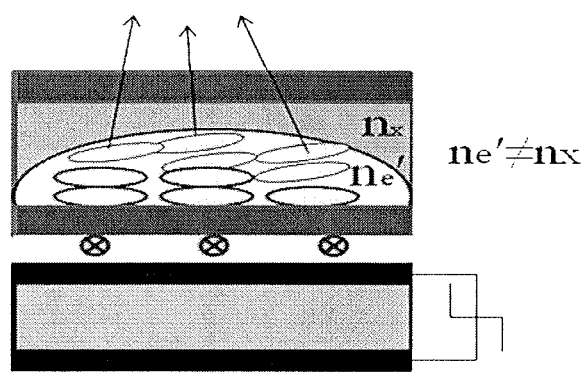
FIG. 3 shows a working diagrammatic sketch of a birefringent grating using a conventional optical resin composition as shown in FIG. 1 under real 2D conditions.

In order to make the object, technical solutions and advantages of the embodiments of the invention more clear, the technical solutions of the embodiments of the present invention are clearly and completely described below in relation to the figures of the embodiments of the present invention. Apparently, the embodiments described are merely some, rather than all embodiments of the present invention. Based on the embodiments of the invention described, any other embodiments obtained by a person of ordinary skill in the art without resorting to creative labor are within the scope of the present invention.

Embodiment 1

48 g o-cresol formaldehyde epoxy acrylate (Beijing Lienhe Communication Technical Co., LTD., NOA71) is thoroughly mixed under room temperature with 20 g 2,5-diacrylic-chloro-propanoic acid ester-1,3,4-thiadiazole (Microsharp corporation Ltd, MSUV), 30 g methacrylate resin (Shenzhen Ransheng Chemical Co., LTD.), and 2 g trimethylolpropane triacrylate (TMPTA), followed by radiation under a UV light source with wavelength of 365 nm for 3 seconds, so as to cure them sufficiently and result in a cured film. Under room temperature, the refractive index of the resultant cured film is measured as 1.5015 using an Abbe refractometer. In the present embodiment, 20 g 2,5-diacrylic-chloro-butanoic acid ester-1,3,4-thiadiazole can also be used with the same result.

Embodiment 2

50 g o-cresol formaldehyde epoxy acrylate (Beijing Lienhe Communication Technical Co., LTD., NOA71) is thoroughly mixed under room temperature with 25 g 2,5-diacrylic-chloro-propanoic acid ester-1,3,4-thiadiazole (Microsharp corporation Ltd, MSUV), 20 g methacrylate resin (Shenzhen Ransheng Chemical Co., LTD.), and 5 g tetrapropylene glycol diacrylate, followed by the preparation of the cured film according to the same method as in Embodiment 1. Under room temperature, the refractive index of the resultant cured film is measured as 1.5135. In the present embodiment, 25 g 2,5-diacrylic-chloro-butanoic acid ester-1,3,4-thiadiazole can also be used with the same result.

Embodiment 3

45 g o-cresol formaldehyde epoxy acrylate (Beijing Lienhe Communication Technical Co., LTD., NOA71) is thoroughly mixed under room temperature with 30 g 2,5-dimethyl-acrylic-propylene glycol ester-1,3,4-thiadiazole (Microsharp corporation Ltd, MSUV), 23 g methacrylate resin (Shenzhen Ransheng Chemical Co., LTD.), and 2 g trimethylolpropane triacrylate (TMPTA), followed by the preparation of the cured film according to the same method as in Embodiment 1. Under room temperature, the refractive index of the resultant cured film is measured as 1.530.

Embodiment 4

44 g o-cresol formaldehyde epoxy acrylate (Beijing Lienhe Communication Technical Co., LTD., NOA71) is thoroughly mixed under room temperature with 27 g 2,5-dimethyl-acrylic-propylene glycerol ester-1,3,4-thiadiazole (Microsharp corporation Ltd, MSUV), 26 g methacrylate resin (Shenzhen Ransheng Chemical Co., LTD.), and 3 g tripropylene glycol diacrylate, followed by the preparation of the cured film according to the same method as in Embodiment 1. Under room temperature, the refractive index of the resultant cured film is measured as 1.5266.

Embodiment 5

40 g phenol formaldehyde epoxy acrylate (Beijing Lienhe Communication Technical Co., LTD., NOA68) is thoroughly mixed under room temperature with 25 g 2,5-diacrylic-chloro-propanoic acid ester-1,3,4-thiadiazole (Microsharp corporation Ltd, MSUV (Trade Name)), 30 g methacrylate resin (Shenzhen Ransheng Chemical Co., LTD.), and 5 g trimethylolpropane triacrylate (TMPTA), followed by the preparation of the cured film according to the same method as in Embodiment 1. Under room temperature, the refractive index of the resultant cured film is measured as 1.5085. In the present embodiment, 25 g 2,5-diacrylic-chloro-butanoic acid ester-1,3,4-thiadiazole can also be used with the same result.

Embodiment 6

42 g o-cresol phenol formaldehyde epoxy acrylate (Wuxi Boqiang High molecular Material Science Co. Ltd., WDS-8059) is thoroughly mixed under room temperature with 25 g 2,5-diacrylic-chloro-propanoic acid ester-1,3,4-thiadiazole (Microsharp corporation Ltd, MSUV (Trade Name)), 30 g methacrylate resin (Shenzhen Ransheng Chemical Co. Ltd.,), and 3 g trimethylolpropane triacrylate (TMPTA), followed by the preparation of the cured film according to the same method as in Embodiment 1. Under room temperature, the refractive index of the resultant cured film is measured as 1.5206. In the present embodiment, 25 g 2,5-diacrylic-chloro-butanoic acid ester-1,3,4-thiadiazole can also be used with the same result.

Figure 4:
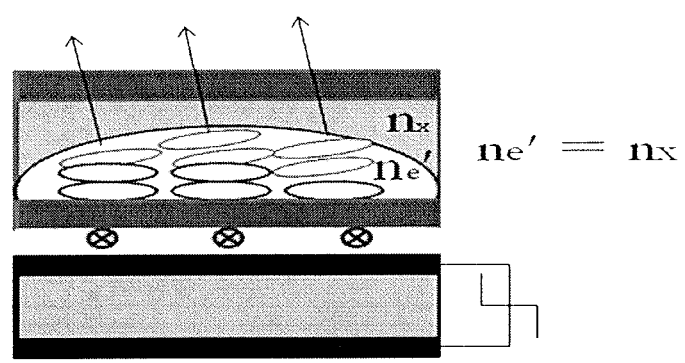
FIG. 4 shows a working diagrammatic sketch of the birefringent grating of the present disclosure under real 2D conditions.

The cured films made from the optical resin compositions prepared in Embodiments 1-6 have refractive indices of 1.5015 to 1.53. These results indicate that when they are made into optical transparent layers having concave lens structure in birefringent gratings, their refractive indices can achieve optimal match with the refractive index of the liquid crystal lens layer, because the refractive index of the liquid crystal lens layer made under conventional process is usually about 1.52. They work under 2D conditions as shown in FIG. 4, so as to improve the visual effect of the naked-eye 3D/2D switchable birefringent grating under 2D conditions.

The aforementioned are merely exemplary embodiments of the present invention, rather than limiting the scope of the invention, which is determined by the appended claims.

The invention claimed is:

1. An optical resin composition comprising the following substances in the following mass percentage:
   unsaturated phenol formaldehyde epoxy acrylate oligomer: 40%-50%,
   thiadiazole moiety-containing monomer: 20%-30%, said thiadiazole moiety-containing monomer is at least one of 2,5-diacrylic-chloro-propanoic acid ester-1,3,4-thiadiazole, 2,5-diacrylic-chloro-butanoic acid ester-1,3,4-thiadiazole, 2,5-dimethyl-acrylic-propylene glycol ester-1,3,4-thiadiazole or 2,5-dimethyl-acrylic-propylene glycerol ester-1,3,4-thiadiazole;
   methacrylate resin: 20%-38%, and
   multifunctional active acrylate monomer: 2%-5%,
   wherein the above mass percentage is based on the mass of the optical resin composition, and wherein said unsaturated phenol formaldehyde epoxy acrylate oligomer is at least one of o-cresol formaldehyde epoxy acrylate, phenol formaldehyde epoxy methacrylate or o-cresol phenol formaldehyde epoxy acrylate.

2. The optical resin composition according to claim 1, wherein the film made from curing the said optical resin composition has a refractive index of 1.5015 to 1.5300.

3. The optical resin composition according to claim 1, wherein said multifunctional active acrylate monomer is at least one of tetrapropylene glycol diacrylate, trimethylolpropane triacrylate or tripropylene glycol diacrylate.

* * * * *